United States Patent
Wada et al.

(10) Patent No.: US 9,832,004 B2
(45) Date of Patent: Nov. 28, 2017

(54) COMMUNICATION CIRCUIT AND COMMUNICATION APPARATUS

(71) Applicant: Sharp Kabushiki Kaisha, Sakai-shi, Osaka (JP)

(72) Inventors: Takeshi Wada, Sakai (JP); Hiroki Kashiwagi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 25 days.

(21) Appl. No.: 15/110,148

(22) PCT Filed: Dec. 24, 2014

(86) PCT No.: PCT/JP2014/084025
§ 371 (c)(1),
(2) Date: Jul. 7, 2016

(87) PCT Pub. No.: WO2015/115001
PCT Pub. Date: Aug. 6, 2015

(65) Prior Publication Data
US 2016/0352495 A1 Dec. 1, 2016

(30) Foreign Application Priority Data
Feb. 3, 2014 (JP) .................................. 2014-018753

(51) Int. Cl.
*H04B 1/40* (2015.01)
*H04L 5/14* (2006.01)
(Continued)

(52) U.S. Cl.
CPC ........... *H04L 5/1453* (2013.01); *H04B 1/406* (2013.01); *H04J 1/12* (2013.01)

(58) Field of Classification Search
CPC .......... H04B 1/406; H04J 1/12; H04L 5/1453; H04L 5/14
See application file for complete search history.

(56) References Cited

U.S. PATENT DOCUMENTS

| | | | | |
|---|---|---|---|---|
| 8,369,250 B1* | 2/2013 | Khlat | ........................ | H04L 5/14 370/280 |
| 2002/0176375 A1* | 11/2002 | Barabash | .......... | H04L 29/06027 370/260 |
| 2012/0231751 A1* | 9/2012 | Oka | ..................... | H04B 1/0053 455/78 |

FOREIGN PATENT DOCUMENTS

JP     2002-152079 A     5/2002

OTHER PUBLICATIONS

Kawai et al., "Center Frequency and Bandwidth Discretely Tunable Bandpass Filter", The Institute of Electronics, Information, and Communication Engineers, IEICE Technical Report, Jul. 2007, vol. 2007-32, pp. 73-76.

* cited by examiner

*Primary Examiner* — Lakeram Jangbahadur
(74) *Attorney, Agent, or Firm* — Keating & Bennett, LLP

(57) ABSTRACT

The present invention brings about an effect of reducing a deterioration in communication quality that may occur in a communication circuit that can communicate in different communication modes. A communication circuit (100) of an aspect of the present invention includes a control section (109) that (i) controls a reception filter (194) such that respective passbands of a transmission filter (103) and the reception filter (104) are different from each other in a case where a full-duplex communication is made in a FDD mode, and (ii) controls the reception filter (104) such that at least part of the passband of the transmission filter (103) and at least part of the passband of the reception filter (104) overlap each other in a case where a full-duplex communication is made in a TDD mode.

4 Claims, 6 Drawing Sheets

(51) Int. Cl.
*H04B 1/403* (2015.01)
*H04J 1/12* (2006.01)

ations to a reception circuit 52 via the antenna sharing device 10 (bandpass filter), the circulator 20, and a bandpass filter 82. Further, according to the FDD mode of the wireless device, a received signal is supplied to the reception circuit 52 via the antenna sharing device 10 and a bandpass filter 84. A received signal thus needs to pass through two filters, irrespective of the TDD mode or the FDD mode. This causes the received signal to be greatly attenuated in the circuit.

COMMUNICATION CIRCUIT AND COMMUNICATION APPARATUS

TECHNICAL FIELD

The present invention relates to a communication circuit that makes a full-duplex communication, and a communication apparatus including such a communication circuit.

BACKGROUND ART

A conventional full-duplex communication has been widely employed, as a wireless communication mode, between mobile devices such as mobile phones and smartphones. Examples of a full-duplex communication mode encompass a frequency division duplex (FDD) mode and a time division duplex (TDD) mode.

Patent Literature 1, which will be later described, discloses a technique related to a mode selection of a dual-mode wireless device that is shared by the TDD mode and the FDD mode. The following description will briefly discuss, with reference to FIG. 7, the wireless device disclosed in Patent Literature 1. FIG. 7 is a circuit diagram illustrating a configuration of the wireless device disclosed in Patent Literature 1.

According to the TDD mode of the wireless device disclosed in Patent Literature 1, in a circulator 20, (i) a transmission signal is supplied from a third terminal 26 to a first terminal 22 and (ii) a received signal is supplied from the first terminal 22 to a second terminal 24 (see FIG. 7). Further, according to the FDD mode of the wireless device, in an antenna sharing device 10, (i) a transmission signal is supplied from a transmitter-receiver terminal 14 to an antenna terminal 12, and (ii) a received signal is supplied from the antenna terminal 12 to a reception terminal 16. According to Patent Literature 1, the wireless device switches between the TDD mode and the FDD mode with use of the antenna sharing device 10 and the circulator 20.

CITATION LIST

Patent Literature

[Patent Literature 1]
Japanese Patent Application Publication Tokukai No. 2002-152079 (Publication date: May 24, 2002)

Non-Patent Literature

[Non-Patent Literature 1]
Kawai Yoshihiro, Okazaki Koji, and Narahashi Syoichi, "Bandpass Filter with Variable Central Frequency and Variable Bandwidth," Shingaku Giho, the Institute of Electronics, Information, and Communication Engineers, July 2007, vol. 2007-32, pp. 73-76.

SUMMARY OF INVENTION

Technical Problem

A wireless circuit, such as the wireless device disclosed in Patent Literature 1, that is configured to communicate in different communication modes requires many components (e.g., filters) through which a received signal passes. This causes the received signal to be greatly attenuated, and may cause a deterioration in communication quality.

Specifically, according to the TDD mode of the wireless device disclosed in Patent Literature 1, a received signal is supplied to a reception circuit 52 via the antenna sharing device 10 (bandpass filter), the circulator 20, and a bandpass filter 82. Further, according to the FDD mode of the wireless device, a received signal is supplied to the reception circuit 52 via the antenna sharing device 10 and a bandpass filter 84. A received signal thus needs to pass through two filters, irrespective of the TDD mode or the FDD mode. This causes the received signal to be greatly attenuated in the circuit.

The present invention is attained in view of the above problem. An object of the present invention is to provide a technique for reducing a deterioration in communication quality of a communication circuit that can communicate in different communication modes.

Solution to Problem

In order to attain the above object, a communication circuit of an aspect of the present invention includes: a transmission section that generates a transmission signal to be transmitted to an outside, via an antenna; a reception section that processes a received signal received from the outside, via the antenna; a first filter that filters the transmission signal supplied from the transmission section; a second filter that is a variable filter, filters the received signal, and supplies the received signal thus filtered to the reception section; a circulator that (i) supplies, to the antenna, a filtered transmission signal supplied from the first filter and (ii) supplies the received signal to the second filter; and a control section that controls the second filter such that a passband of the second filter is changed, the control section controlling the second filter such that the passband of the second filter is different from a passband of the first filter in a case where a full-duplex communication is made in a first communication mode in which respective frequency bands of the transmission signal and the received signal are different from each other, the control section controlling the second filter such that (i) at least part of the passband of the first filter and (ii) at least part of the passband of the second filter overlap each other in a case where a full-duplex communication is made in a second communication mode in which the respective frequency bands of the transmission signal and the received signal match each other.

Advantageous Effects of Invention

An aspect of the present invention brings about an effect of reducing a deterioration in communication quality.

DESCRIPTION OF EMBODIMENTS

<Embodiment 1>

Figure 1:
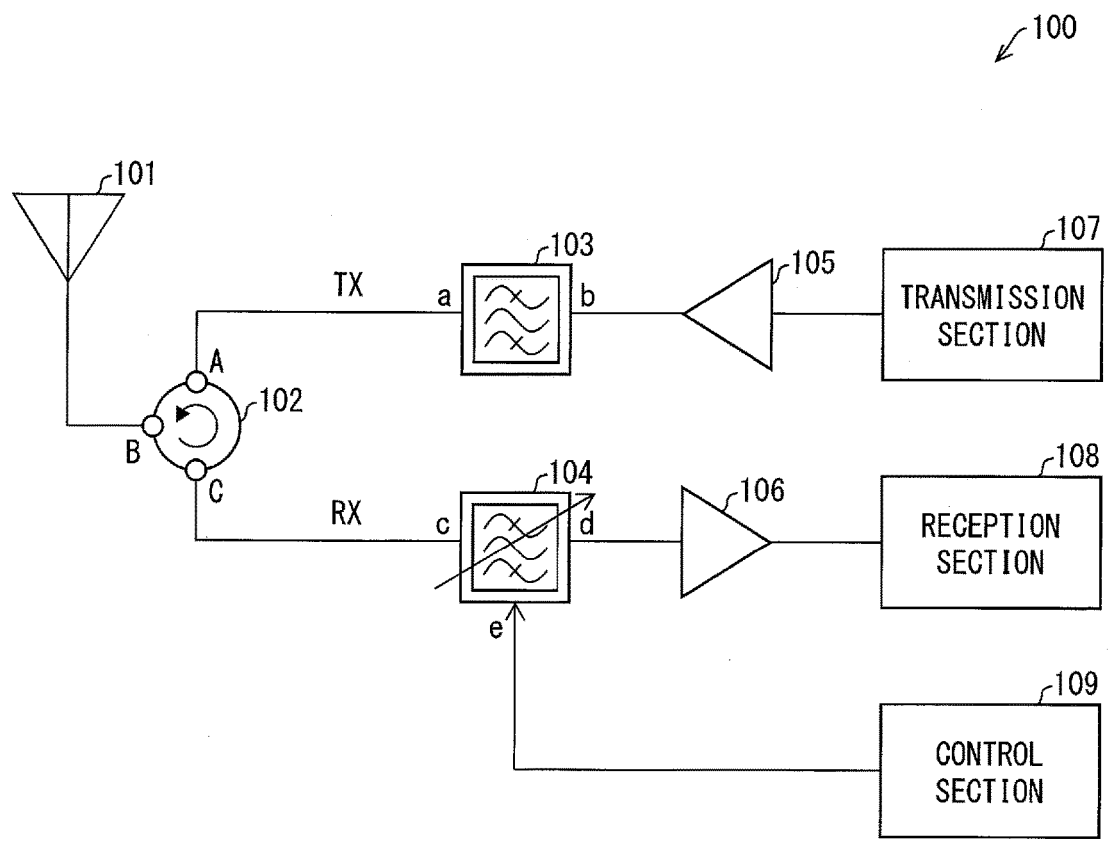
FIG. 1 is a circuit diagram illustrating a main configuration of a communication circuit of Embodiment 1 of the present invention.
Figure 2:
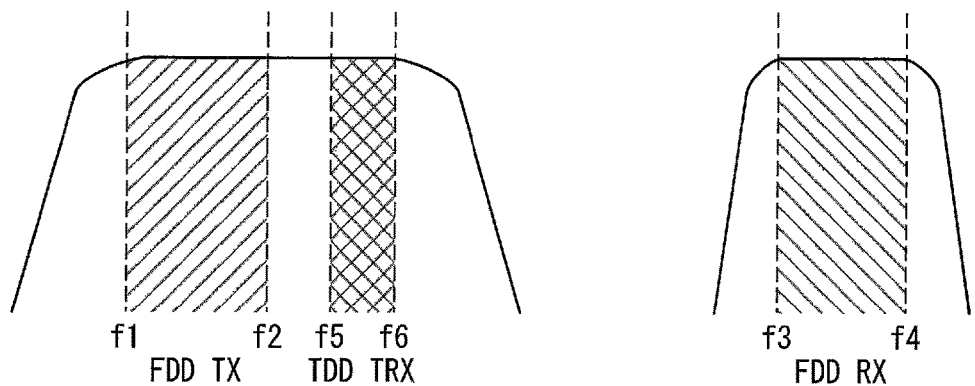
FIG. 2 is a view schematically illustrating examples of a transmission frequency band and a reception frequency band employed in cases where the communication circuit of Embodiment 1 of the present invention makes a wireless communication in a FDD mode or a TDD mode.
Figure 3:
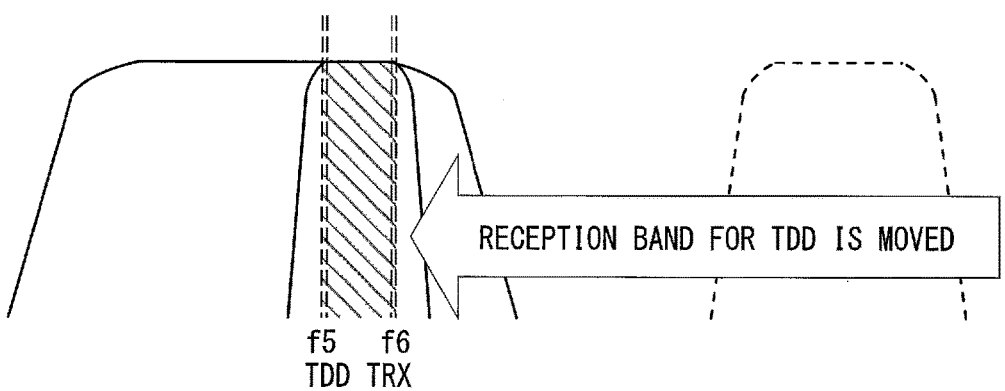
FIG. 3 is a view schematically illustrating an example of how a reception frequency band of a variable filter is changed in a case where the communication circuit of Embodiment 1 of the present invention makes a wireless communication in the TDD mode.

The following description will discuss, with reference to FIGS. 1 through 3, a communication circuit of Embodiment of the present invention. Note that unless otherwise specified, a configuration discussed in Embodiment 1 should not be construed as limiting the scope of the present invention, and is illustrative only.

Examples of a communication apparatus including a communication circuit 100 of Embodiment 1 encompass mobile communication apparatuses such as a mobile phone, a smartphone, and a PHS. Note, however, that a communication apparatus is not limited as such.

[Overview of Communication Modes]

An overview of communication modes of the communication circuit 100 of Embodiment 1 will be first described below.

The communication circuit 100 of Embodiment 1 makes a wireless communication with other communication apparatuses (e.g., communication base stations or other mobile communication apparatuses). The communication circuit 100 is capable of making a wireless communication employing a full-duplex communication mode (hereinafter, simply referred to as "wireless communication"). A frequency division duplex (FDD) mode (first communication mode) and a time division duplex (TDD) mode (second communication mode) are employed as full-duplex communication modes. The communication circuit 100 makes a communication by selecting, as appropriate, between the TDD mode and the FDD mode.

Note that the FDD mode as used herein means a mode in which a full-duplex communication is achieved by causing respective frequency bands of a transmission signal and a received signal to be different from each other. The TDD mode as used herein means a mode in which (i) respective frequency bands of a transmission signal and a received signal are kept to be identical to each other and (ii) a full-duplex communication is achieved by selecting, in a time division manner, between transmission and reception.

Note, hereinafter, that among frequency bands employed for wireless communications, (i) a frequency band employed during transmission may be referred to as a "transmission frequency band" and (ii) a frequency band employed during reception may be referred to as a "reception frequency band."

[Configuration of Communication Circuit]

An overview of a configuration of the communication circuit 100 of Embodiment 1 will be described below with reference to FIG. 1. FIG. 1 is a circuit diagram illustrating a main configuration of the communication circuit 100 of Embodiment 1. As illustrated in FIG. 1, the communication circuit 100 of Embodiment 1 includes an antenna 101, a circulator 102, a transmission filter (first filter) 103, a reception filter (second filter) 104, a transmission signal amplifier 105, a received signal amplifier 106, a transmission section 107, a reception section 108, and a control section 109.

As illustrated in FIG. 1, the communication circuit 100 is configured such that a terminal B of the circulator 102 is connected to the antenna 101, a terminal A of the circulator 102 is connected to an output terminal a of the transmission filter 103, and a terminal C of the circulator 102 is connected to a first input terminal c of the reception filter 104. An output terminal of the transmission signal amplifier 105 is connected to an input terminal b of the transmission filter 103. An input terminal of the transmission signal amplifier 105 is connected to the transmission section 107. An input terminal of the received signal amplifier 106 is connected to an output terminal d of the reception filter 104. An output terminal of the received signal amplifier 106 is connected to the reception section 108. A second input terminal e of the reception filter 104 is connected to the control section 109. Note that a control signal is supplied, from the control section 109, to the second terminal e of the reception filter 104.

The communication apparatus including the communication circuit 100 makes a wireless communicating with an outside (a communication apparatus(s)) in the TDD mode or the FDD mode. Note, hereinafter, that (i) a signal received from the outside may be referred to as a "received signal" and (ii) a signal to be transmitted to the outside may be referred to as a "transmission signal."

The circulator 102 is a device that causes a signal, supplied to each terminal, to pass through in a single direction (in Embodiment 1, a direction indicated by an arrow in FIG. 1, i.e., a counterclockwise direction). Specifically, a signal supplied to the terminal A is to be outputted from the terminal B, a signal supplied to the terminal B is to be outputted from the terminal C, and a signal supplied to the terminal C is to be outputted from the terminal A. With the configuration, the circulator 102 supplies, to the antenna 105 via the terminal B, a transmission signal supplied from the filter 103 via the terminal A. The circulator 102 supplies, to the reception filter 104 via the terminal C, a received signal supplied via the terminal B from the antenna 101.

Each of the transmission filter 103 and the reception filter 104 is a so-called bandpass filter that (i) attenuates frequency components of frequency bands other than a given frequency band and (ii) selectively allows frequency components of the given frequency band to pass through the bandpass filter (hereinafter, this may be referred to as "filter"). Each of the transmission filter 103 and the reception filter 104 can be configured by, for example, a bandpass filter or a combination of a highpass filter and a lowpass filter, but is not limited to a particular configuration in the present invention.

The transmission filter 103 filters frequency components of a transmission frequency band, and the reception filter 104 filters frequency components of a reception frequency band. Note that, according to Embodiment 1, (i) the reception filter 104 is a variable filter and (ii) a change (selection) of a passband of the reception filter 104 is controlled in response to a control signal supplied from the control section 109.

As used herein, "a variable filter" means a filter whose passband is variable. Examples of a method of changing a passband encompass (i) a method in which a central frequency of a passband is changed instead of changing a bandwidth of the passband, (ii) a method in which a bandwidth of a passband is changed, and (iii) a method in which both of a central frequency and a bandwidth of a passband are changed. For example, Non-Patent Literature 1 discloses a variable bandpass filter whose central frequency and bandwidth are each variable.

The transmission signal amplifier 105 is an amplifier circuit that amplifies a transmission signal. The received signal amplifier 106 is an amplifier circuit that amplifies a received signal. Each of the transmission signal amplifier 105 and the received signal amplifier 106 can be configured, for example, by an operational amplifier. Note, however, that the present invention is not limited as such.

The transmission section 107 is a transmission circuit that generates a transmission signal to be transmitted to an outside of the communication circuit 100. The reception section 108 is a reception circuit that processes a signal supplied from the outside of the communication section 100.

The control section 109 comprehensively controls processes related to a communication made by the communication circuit 100. The control section 109 supplies, to the reception filter 104, a control signal for changing a passband of the reception filter 104.

Specifically, the control section 109 controls the reception filter 104 such that respective passbands of the transmission filter 103 and the reception filter 104 are different from each other in a case where a wireless communication (full-duplex communication) is made in the FDD mode. The control section 109 also controls the reception filter 104 such that the respective passbands of the transmission filter 103 and the reception filter 104 at least partially overlap each other in a case where a wireless communication is made in the TDD mode. How the control is carried out will be later discussed in detail.

Note that each of the transmission section 107, the reception section 108, and the control section 109 can be realized by, for example, an integrated circuit (IC) or a central processing unit (CPU), but is not limited as such in the present invention.

[Operation of Communication Circuit]

The following description will discuss, with reference with FIGS. 2 and 3, how the communication circuit 100 operates in each communication mode (TDD mode and FDD mode). FIG. 2 is a view schematically illustrating examples of a transmission frequency band and a reception frequency band employed in a case where a wireless communication is made in the FDD mode or the TDD mode. FIG. 3 is a view schematically illustrating an example of how a reception frequency band of a variable filter is changed in a case where the communication circuit 100 of Embodiment 1 makes a wireless communication in the TDD mode.

According to the communication circuit 100 of Embodiment 1, a transmission frequency band to pass through the transmission filter 103 falls within a range from f1 (e.g., 1920 MHz) to f6 (e.g., 2025 MHz) (see FIG. 2). Such a range includes (i) a transmission frequency band which falls within a range from f1 (e.g., 1920 MHz) to f2 (e.g., 1980 MHz) (FDD TX) which frequency band is employed in a case where a wireless communication is made in the FDD mode and (ii) a transmission frequency band which falls within a range from f5 (e.g., 2010 MHz) to f6 (e.g., 2025 MHz) (TDD TRX) which frequency band is employed in a case where a wireless communication is made in the TDD mode. That is, the passband of the transmission filter 103 includes (i) a transmission frequency band (first frequency band) that is employed in a case where a wireless communication is made in the FDD mode and (ii) a transmission frequency band (second frequency band) that is employed in a case where a wireless communication is made in the TDD mode.

In a case where the communication circuit 100 makes a wireless communication in the FDD mode, the reception filter 104 filters a reception frequency band that falls within a range from f3 (e.g., 2110 MHz) to f4 (2170 MHz) (FDD RX) (see FIG. 2). Note that specific values of the respective frequency bands in the present specification are illustrative only to make the description clear, and are not particularly limited as such.

The control section 109 controls the reception filter 104 such that a reception frequency band to pass through the reception filter 104 falls within a range from f5 to f6 in a case where the communication circuit 100 makes a wireless communication in the TDD mode (see FIG. 3). In other words, the control section 109 controls the reception filter 104 such that (i) the reception frequency band to pass through the reception filter 104 and (ii) the transmission frequency band to pass through the transmission filter 103 overlap (match) each other in a case where a wireless communication is performed in the TDD mode.

The control section 109 controls the reception filter 104 such that the reception frequency band, to pass through the reception filter 104, is changed (moved or switched) to the reception frequency band which falls within a range from f5 to f6 (see FIG. 3) in a case where a wireless communication mode of the communication circuit 100 is switched from the FDD mode to the TDD mode. The control section 109 also controls the reception filter 104 such that the reception frequency band, to pass through the reception filter 104, is changed to the reception frequency band which falls within a range from f3 to f4 (see FIG. 2) in a case where a wireless communication mode of the communication circuit 100 is switched from the TDD mode to the FDD mode.

As such, the communication circuit 100 can set the reception frequency band such that the reception frequency band is different from the transmission frequency band in a case where a wireless communication is made in the FDD mode in which signals are transmitted and received via respective different frequency bands. Similarly, the communication circuit 100 can set the reception frequency band such that the reception frequency band is kept to be identical to the transmission frequency band in a case where a wireless communication is made in the TDD mode in which signals are transmitted and received via an identical frequency band.

With the configuration of the communication circuit 100, it is possible to achieve a dual-mode communication circuit in which a wireless communication is made by switching between the FDD mode and the TDD mode with use of a single circuit. A communication apparatus including the communication circuit 100 can achieve a dual-mode communication apparatus.

With the configuration of the communication circuit 100 of Embodiment 1, a received signal is supplied, in both of the FDD mode and the TDD mode, to the reception section 108, via the circulator 102, the reception filter 104, and the received signal amplifier 106 (see FIG. 1). That is, the received signal needs only to pass through a single filter (reception filter 104) in the communication circuit 100 before the received signal is supplied to the reception section 108.

The communication circuit 100 and the communication apparatus including the communication circuit 100 therefore allow a reduction in attenuation of received signals in a circuit, as compared with conventional techniques. This ultimately allows an improvement in reception efficiency and communication quality.

The communication circuit 100 allows a reduction in the number of components that constitute a circuit, as compared with conventional techniques. This ultimately allows the communication circuit 100 to be downsized.

<Variation>

According to Embodiment 1, an example configuration is described in which the transmission frequency band to pass through the transmission filter 103 includes (i) a transmission frequency band that is employed in a case where a wireless communication is made in the FDD mode and (ii) a transmission frequency band that is employed in a case where a wireless communication is made in the TDD mode. Embodiment 1, however, is not limited such an example configuration.

Figure 4:
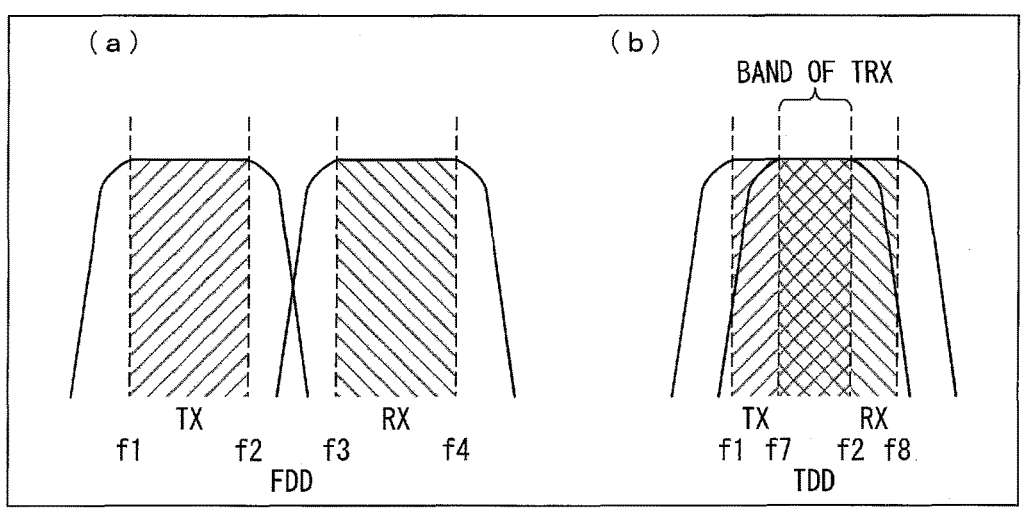
FIG. 4 is a view schematically illustrating examples of a transmission frequency band and a reception frequency band employed in a communication circuit of a variation of Embodiment 1 of the present invention.

The following description will discuss a variation of Embodiment 1 with reference to FIG. 4. FIG. 4 is a view schematically illustrating examples of a transmission frequency band and a reception frequency band employed in a communication circuit of the variation of Embodiment 1. (a) of FIG. 4 schematically illustrates examples of a transmission frequency band and a reception frequency band employed in a case where a wireless communication is made in the FDD mode. (b) of FIG. 4 schematically illustrates examples of a transmission frequency band and a reception frequency band employed in a case where a wireless communication is made in the TDD mode.

According to the communication circuit 100 of the variation, a frequency band which falls within a range from f1 to f2 is set as a transmission frequency band that is to be pass through a transmission filter 103 in a case where a wireless communication is made in the FDD mode (see (a) of FIG. 4). A part of the range from f1 to f2 is employed as the transmission frequency band to pass through the transmission filter 103 (this process will be later described) in a case where a wireless communication is made in the TDD mode. A frequency band which falls within a range from f3 to f4 is set as a reception frequency band that is to pass through a reception filter 104 in a case where the wireless communication is made in the FDD mode.

The control section 109 controls the reception filter 104 such that a reception frequency band to pass through the reception filter 104 falls within a range from f7 to f8, i.e., such that at least part of the reception frequency band and at least part of a frequency band which falls within a range from f1 to f2 overlap each other in a case where the communication circuit 100 makes a wireless communication in the TDD mode (see (b) of FIG. 4). In other words, the control section 109 controls the reception filter 104 such that (i) the reception frequency band to pass through the reception filter 104 in a case where a wireless communication is made in the TDD mode and (ii) the transmission frequency band to pass through the transmission filter 103 in a case where a wireless communication is made in the FDD mode, partially overlap each other in a case where wireless communication is performed in the TDD mode.

The transmission filter 103 and the reception filter 104 employ, as a frequency band which is to pass therethrough in a case where the wireless communication is made in the TDD mode, such an overlapping frequency band (frequency band which falls within a range from f7 to f2) (see (b) of FIG. 4).

With a configuration in which the reception filter 104 is a variable filter, the control section 109 controls the reception filter 104 such that (i) the reception frequency band to pass through the reception filter 104 and (ii) the transmission frequency band to pass through the transmission filter 103 overlap each other in a case where a wireless communication is made in the TDD mode. This allows signals to be transmitted and received via the overlapping frequency band in the TDD mode.

With the configuration of the communication circuit 100 of the variation, the received signal needs only to pass through, in both of the FDD mode and the TDD mode, a single filter (reception filter 104) in the communication circuit 100 before the received signal is supplied to the reception section 108. The communication circuit 100 and the communication apparatus including the communication circuit 100 therefore allow a reduction in attenuation of received signals in a circuit, as compared with conventional techniques. This ultimately allows an improvement in reception efficiency and communication quality.

The communication circuit 100 of the variation allows a reduction in the number of components that constitute a circuit, as compared with conventional techniques. This ultimately allows the communication circuit 100 to be downsized.

<Embodiment 2>

Embodiment 1 has described an example configuration in which the reception filter 104 is a variable filter. The present invention is, however, not limited to such an example configuration, and can be alternatively configured such that, for example, the transmission filter 103 is also a variable filter.

Figure 5:
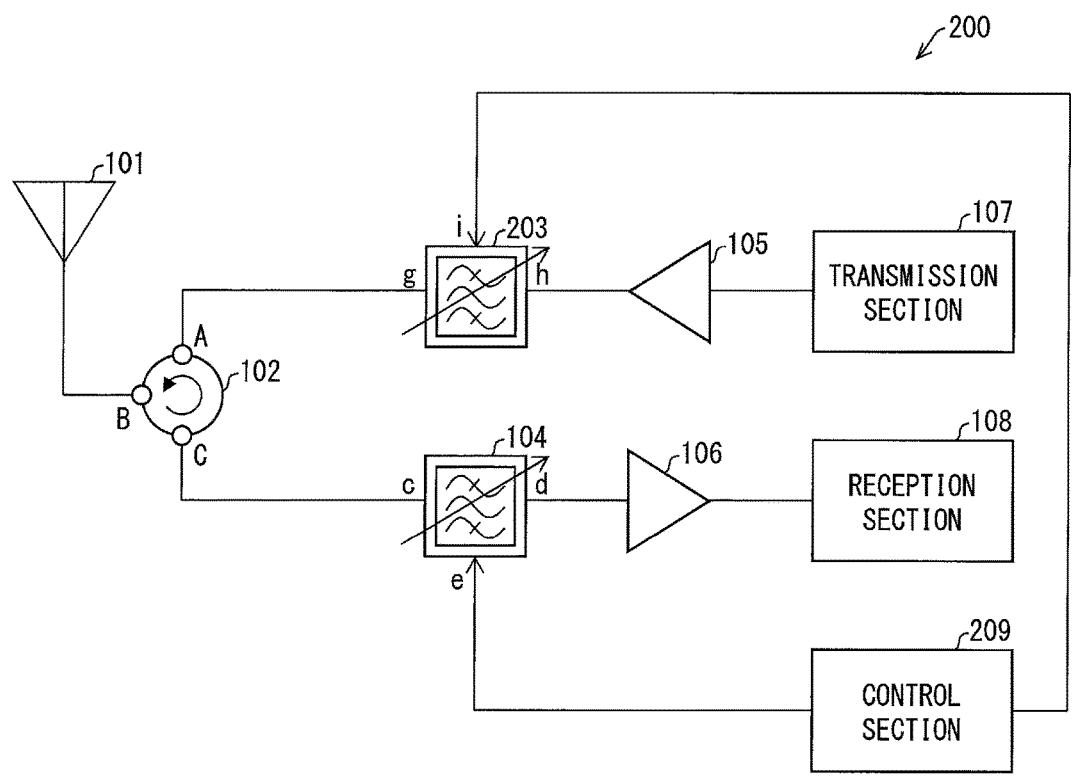
FIG. 5 is a circuit diagram illustrating a main configuration of a communication circuit of Embodiment 2 of the present invention.
Figure 6:
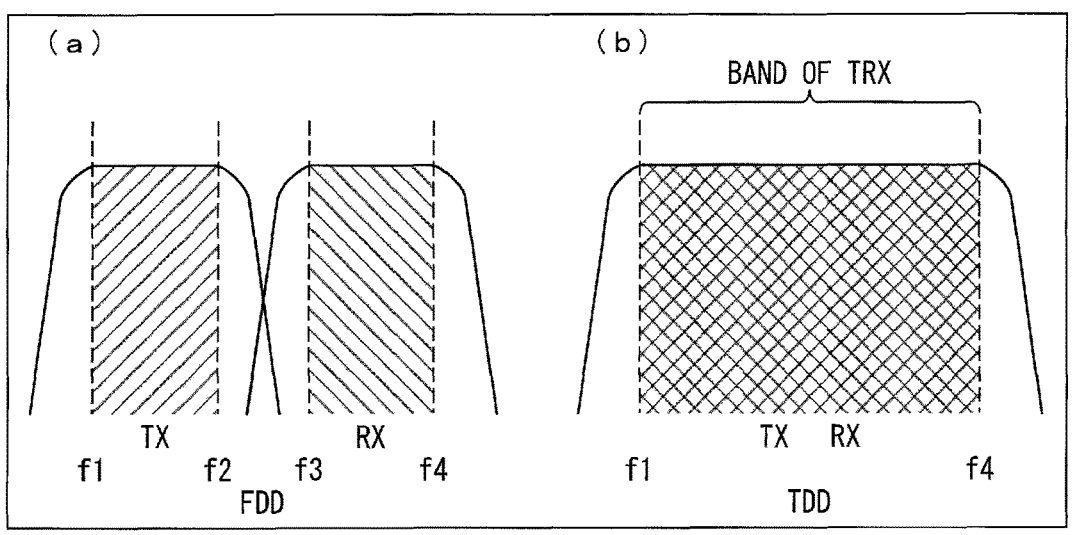
FIG. 6 is a view schematically illustrating examples of a transmission frequency band and a reception frequency band employed in the communication circuit of a variation of Embodiment 2 of the present invention.
Figure 7:
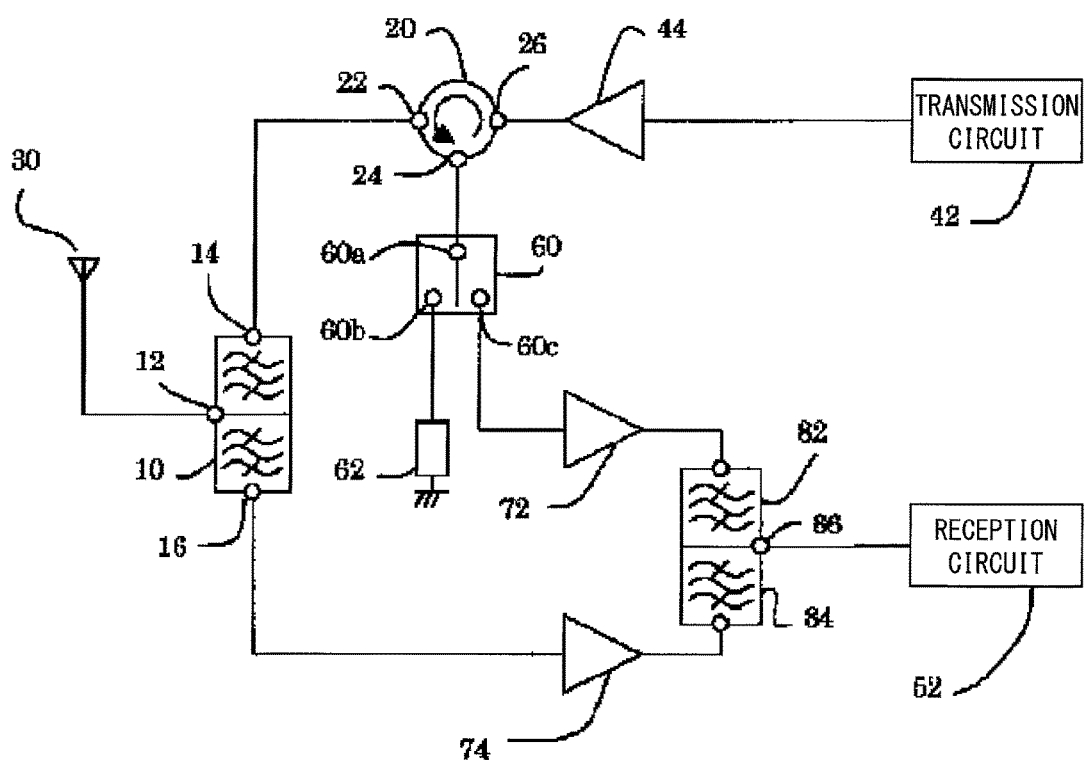
FIG. 7 is a circuit diagram illustrating a configuration of a wireless device of a conventional technique.

The following description will discuss a communication circuit 200 of Embodiment 2 with reference to FIGS. 5 and 6. Note that for convenience of explanation, members having the same functions as those of the communication circuit 100 of Embodiment 1 are given the same reference numerals, and explanations of such members will be omitted. Note that Embodiment 2 will mainly discuss differences from the Embodiment 1.

[Configuration of Communication Circuit]

A main configuration of the communication circuit 200 of Embodiment 2 will be first described below with reference to FIG. 5. FIG. 5 is a circuit diagram illustrating the main configuration of the communication circuit 200 of Embodiment 2. As illustrated in FIG. 5, the communication circuit 200 has a configuration similar to that of the communication circuit 100 of Embodiment 1, except that the communication circuit 200 includes a communication filter 203 (first filter) and a control section 209, instead of being provided with the transmission filter 103 and the control section 109 of the communication circuit 100 of Embodiment 1.

The transmission filter 203 is a so-called bandpass filter that (i) attenuates frequency components of frequency bands other than a given frequency band and (ii) selectively allows frequency components of the given frequency band to pass through (to be filtered by) the bandpass filter. The transmission filter 203 is also a variable filter, and a change (selection) of a passband of the transmission filter 203 is controlled in response to a control signal supplied from the control section 209.

An output terminal g of the transmission filter 203 is connected to a terminal A of a circulator 102. A first input terminal h of the transmission filter 203 is connected to an output terminal of a transmission signal amplifier 105. A second input terminal i of the transmission filter 203 is connected to the control section 209. Note that a control signal is supplied, from the control section 209, to the second input terminal i.

The control section 209 comprehensively controls processes related to a communication made by the communication circuit 200. The control section 209 supplies, to the transmission filter 203 and to a reception filter 104, a control signal for changing respective passbands of the transmission filter 203 and the reception filter 104.

[Operation of Communication Circuit]

The following description will discuss, with reference to FIG. 6, how the communication circuit 200 operates in each communication mode (TDD mode and FDD mode). FIG. 6 is a view schematically illustrating examples of a transmission frequency band and a reception frequency band employed in a communication circuit of a variation of Embodiment 2. (a) of FIG. 6 schematically illustrates examples of a transmission frequency band and a reception frequency band employed in a case a where a wireless communication is made in the FDD mode. (b) of FIG. 6 illustrates examples of a transmission frequency band and a reception frequency band employed used in a case where a wireless communication is made in the TDD mode.

According to the communication circuit 200 of Embodiment 2, (i) a frequency band which falls within a range from f1 to f2 is set as a transmission frequency band that is to pass through the transmission filter 203 in a case where a wireless communication is made in the FDD mode, and (ii) a frequency band which falls within a range from f3 to f4 is set as a reception frequency band that is to pass through by the reception filter 104 in a case where a wireless communication is made in the FDD mode (see (a) of FIG. 6).

The control section 209 controls the transmission filter 203 such that a transmission frequency band to pass through the transmission filter 203 is widened to include a reception frequency band to pass through the reception filter 104 in a case where the communication circuit 200 makes a wireless communication in the TDD mode. The control section 109 also controls the reception filter 104 such that the reception frequency band to pass through the reception filter 104 is widened to include the transmission frequency band to pass through the transmission filter 203. This causes respective passbands of the transmission filter 203 and the reception filter 104 to overlap each other.

According to Embodiment 2, the control section 209 controls the transmission filter 203 such that an upper limit of the transmission frequency band to pass through the transmission filter 203 is widened to the frequency f4, which is identical to an upper limit of the reception frequency band to pass through the reception filter 104. The control section 209 also controls the reception filter 104 such that a lower limit of the reception frequency band to pass through the reception filter 104 is widened to the frequency f1, which is identical to a lower limit of the transmission frequency band to pass through the transmission filter 203.

This causes (i) the transmission frequency band, to pass through the transmission filter 203, and (ii) the reception frequency band, to pass through the reception filter 104, to overlap (match (in Embodiment 2)) each other in a case where the communication circuit 200 makes a wireless communication in the TDD mode. This allows the communication circuit 200 to transmit and receive signals via a frequency band matched by the control section 209 in a case where the communication circuit 200 makes a wireless communication in the TDD mode.

With the configuration of the communication circuit 200 of Embodiment 2, the received signal needs only to pass through, in both of the FDD mode and the TDD mode, a single filter (reception filter 104) in the communication circuit 200 before the received signal is supplied to the reception section 108. The communication circuit 200 and a communication apparatus including the communication circuit 200 therefore allow a reduction in attenuation of received signals in a circuit, as compared with conventional techniques. This ultimately allows an improvement in reception efficiency and communication quality.

The communication circuit 200 allows a reduction in the number of components that constitute a circuit, as compared with conventional techniques. This ultimately allows the communication circuit 200 to be downsized.

<Software Implementation Example>

Control blocks of the communication circuits 100 and 200 (particularly, the transmission section 107, the reception section 108, and the control sections 109 and 209) each can be realized by a logic circuit (hardware) provided in an integrated circuit (IC chip) or the like or can be alternatively realized by software as executed by a central processing unit (CPU).

In the latter case, the communication circuits 100 and 200 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

A communication circuit (communication circuit 100 or 200) of a first aspect of the present invention includes: a transmission section (transmission section 107) that generates a transmission signal to be transmitted to an outside, via an antenna; a reception section (reception section 108) that processes a received signal received from the outside, via the antenna; a first filter (transmission filter 103 or 203) that filters the transmission signal supplied from the transmission section; a second filter (reception filter 104) that is a variable filter, filters the received signal, and supplies the received signal thus filtered to the reception section; a circulator (circulator 102) that (i) supplies, to the antenna, a filtered transmission signal supplied from the first filter and (ii) supplies the received signal to the second filter; and a control section (control section 109 or 209) that controls the second filter such that a passband of the second filter is changed, the control section controlling the second filter such that the passband of the second filter is different from a passband of the first filter in a case where a full-duplex communication is made in a first communication mode (FDD mode) in which respective frequency bands of the transmission signal and the received signal are different from each other, the control section controlling the second filter such that (i) at least part of the passband of the first filter and (ii) at least part of the passband of the second filter overlap each other in a case where a full-duplex communication is made in a second communication mode (TDD mode) in which the respective frequency bands of the transmission signal and the received signal match each other.

According to the configuration, the control section (i) controls the second filter such that the respective passbands of the first and second filters are different from each other in a case where a full-duplex communication is made in the first communication mode, and (ii) controls the second filter such that the respective passbands of the first and second filters at least partially overlap each other in a case where a full-duplex communication is made in the second communication mode. The communication circuit therefore transmits the transmission signal and receives the received signal via the respective passbands of the first and second filters which passbands are different from each other, in a case where a full-duplex communication is made in the first communication mode. Alternatively, the communication circuit transmits the transmission signal and receives the received signal via a frequency band in which the respective passbands of the first and second filters overlap each other, in a case where a full-duplex communication is made in the second communication mode. It is therefore possible to achieve the communication circuit that can communicate in different communication modes.

According to the configuration, the received signal needs only to pass through, in both of the two communication modes, a single filter in the communication circuit. The communication circuit therefore allows a reduction in attenuation of received signals in a circuit, as compared with a conventional technique in which a received signal needs to pass through at least two filters. This ultimately allows an improvement in reception efficiency and reduces a deterioration in communication quality.

In a second aspect of the present invention, the communication circuit (communication circuit 100) can be arranged such that, in the first aspect of the present invention, the passband of the first filter (transmission filter 103) includes (i) a first frequency band employed for the transmission signal in a case where the full-duplex communication is made in the first communication mode and (ii) a second frequency band employed for the transmission signal in a case where the full-duplex communication is made in the second communication mode; and the control section (control section 109) controls the second filter such that the passband of the second filter and the second frequency band overlap each other in a case where the full-duplex communication is made in the second communication mode.

According to the configuration, it is possible to suitably achieve the communication circuit that can communicate in different communication modes.

In a third aspect of the present invention, the communication circuit (communication circuit 100) can be arranged such that, in the first aspect of the present invention, the control section (control section 109) controls the second filter such that at least part of the passband of the second filter and at least part of the passband of the first filter overlap each other in a case where the full-duplex communication is made in the second communication mode; and the control section controls the first filter (transmission filter 103) such that the first filter filters a frequency band which overlaps with the passband of the second filter, in a case where the full-duplex communication is made in the second communication mode.

According to the configuration, it is possible to suitably achieve the communication circuit that can communicate in different communication modes.

In a fourth aspect of the present invention, the communication circuit (communication circuit 200) can be arranged such that, in the first aspect of the present invention, the first filter (transmission filter 203) is a variable filter; and the control section (control section 209) controls the first filter such that the passband of the first filter is widened to include the passband of the second filter and (i) the second filter such that the passband of the second filter is widened to include the passband of the first filter, in a case where the full-duplex communication is made in the second communication mode.

According to the configuration, it is possible to suitably achieve the communication circuit that can communicate in different communication modes. Further, all frequency bands that are allocated for a transmission frequency band and a reception frequency band in the FDD mode can also be employed in the TDD mode. This ultimately allows an efficient full-duplex communication.

In a fifth aspect of the present invention the communication circuit can be arranged such that, in any one of the first to fourth aspects of the present invention, the first communication mode is a communication mode in which the full-duplex communication is made in a frequency division duplex (FDD), and the second communication mode is a communication mode in which the full-duplex communication is made in a time division duplex (TDD).

According to the configuration, it is possible to suitable achieve the communication circuit that can communicate in both of the frequency division duplex and the time division duplex.

A communication apparatus of a sixth aspect of the present invention can include the communication circuit of any one of the first to fifth aspects of the present invention.

According to the configuration, the communication device can achieve the same effect as that achieved by the communication circuit.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is suitably applicable to a communication circuit that makes a full-duplex communication, and communication apparatuses, such as a mobile phone, a smartphone, and a PHS, that make respective full-duplex communications.

REFERENCE SIGNS LIST 100, 200: Communication circuit
101: Antenna
102: Circulator
103, 203: Transmission filter (first filter)
104: Reception filter (second filter)
105: Transmission signal amplifier
106: Received signal amplifier
107: Transmission section
108: Reception section
109, 209: Control section

The invention claimed is:

1. A communication circuit, comprising:
a transmission section that generates a transmission signal to be transmitted to an outside, via an antenna;
a reception section that processes a received signal received from the outside, via the antenna;
a first filter that filters the transmission signal supplied from the transmission section;
a second filter that is a variable filter, filters the received signal, and supplies the received signal thus filtered to the reception section;
a circulator that (i) supplies, to the antenna, a filtered transmission signal supplied from the first filter and (ii) supplies the received signal to the second filter; and
a control section that controls the second filter to change a second passband of the second filter, wherein
the control section controlling the second filter to make the second passband of the second filter different from a first passband of the first filter in a case where a full-duplex communication is made in a first communication mode in which respective frequency bands of the transmission signal and the received signal are different from each other,
the control section controlling the second filter to make (i) at least part of the first passband of the first filter and (ii) at least part of the second passband of the second filter overlap each other in a case where a full-duplex communication is made in a second communication mode in which the respective frequency bands of the transmission signal and the received signal match each other,
the first passband of the first filter includes (i) a first frequency band employed for the transmission signal in a case where the full-duplex communication is made in the first communication mode and (ii) a second frequency band employed for the transmission signal in a case where the full-duplex communication is made in the second communication mode; and
the control section controls the second filter to make the second passband of the second filter and the second frequency band overlap each other in a case where the full-duplex communication is made in the second communication mode.

2. The communication circuit as set forth in claim 1, wherein:
the control section controls the second filter to make (i) at least part of the second passband of the second filter and (ii) at least part of the first passband of the first filter overlap each other in a case where the full-duplex communication is made in the second communication mode; and
the control section controls the first filter to make the first filter a frequency band which overlaps with the second passband of the second filter, in a case where the full-duplex communication is made in the second communication mode.

3. The communication circuit as set forth in claim 1, wherein:
the first filter is a variable filter; and
the control section controls (i) the first filter to make the first passband of the first filter widened to include the second passband of the second filter and (ii) the second filter to make the second passband of the second filter is widened to include the first passband of the first filter, in a case where the full-duplex communication is made in the second communication mode.

4. A communication apparatus, comprising:
a communication circuit, which includes:
a transmission section that generates a transmission signal to be transmitted to an outside, via an antenna;
a reception section that processes a received signal received from the outside, via the antenna;
a first filter that filters the transmission signal supplied from the transmission section;
a second filter that is a variable filter, filters the received signal, and supplies the received signal thus filtered to the reception section;
a circulator that (i) supplies, to the antenna, a filtered transmission signal supplied from the first filter and (ii) supplies the received signal to the second filter; and
a control section that controls the second filter to change a second passband of the second filter, wherein
the control section controlling the second filter to make the second passband of the second filter different from a first passband of the first filter in a case where a full-duplex communication is made in a first communication mode in which respective frequency bands of the transmission signal and the received signal are different from each other,
the control section controlling the second filter to make (i) at least part of the first passband of the first filter and (ii) at least part of the second passband of the second filter overlap each other in a case where a full-duplex communication is made in a second communication mode in which the respective frequency bands of the transmission signal and the received signal match each other,
the first passband of the first filter includes (i) a first frequency band employed for the transmission signal in a case where the full-duplex communication is made in the first communication mode and (ii) a second frequency band employed for the transmission signal in a case where the full-duplex communication is made in the second communication mode; and
the control section controls the second filter to make the second passband of the second filter and the second frequency band overlap each other in a case where the full-duplex communication is made in the second communication mode.

* * * * *